United States Patent [19]

Smentek et al.

[11] Patent Number: 5,740,087
[45] Date of Patent: Apr. 14, 1998

[54] APPARATUS AND METHOD FOR REGULATING POWER CONSUMPTION IN A DIGITAL SYSTEM

[75] Inventors: David R. Smentek, Columbia, Md.; Craig A. Heikes, Fort Collins; Robert H. Miller, Jr., Loveland, both of Colo.

[73] Assignee: Hewlett-Packard Company, Palo Alto, Calif.

[21] Appl. No.: 656,125

[22] Filed: May 31, 1996

[51] Int. Cl.$^6$ .................................................. G06F 1/00
[52] U.S. Cl. ........................................ 364/707; 395/750
[58] Field of Search .................................... 364/707, 492; 395/750

[56] References Cited

U.S. PATENT DOCUMENTS 5,361,364  11/1994  Nagashige et al. .................. 395/750

Primary Examiner—Tan V. Mai
Attorney, Agent, or Firm—Kevin M. Hart

[57] ABSTRACT

An apparatus and method are disclosed for regulating power consumption in a digital system of the kind including at least one triggerable functional block that consumes more power when triggered than when not triggered. In an embodiment for use with a digital system that includes a pipeline of such triggerable functional blocks, a state machine sequentially applies trigger pulses to each of the functional blocks in the pipeline whenever the output of an OR gate is asserted. It does so by generating a series of enable signals that are used to gate a clock signal to the trigger inputs of the functional blocks. The state machine includes a series of storage devices having outputs. Outputs of the storage devices are used to provide the enable signals. The inputs of the OR gate are coupled to a start signal that indicates when the functional blocks should be triggered to process data, and also to a dummy start signal that indicates when the functional blocks should be triggered to maintain power consumption. Outputs from the storage devices are also used to indicate the number of times the pipeline has been triggered during a recent number of clock cycles. A programmable register is used to store a data value corresponding to the minimum desired level of power consumption for the pipelined functional blocks. The dummy start signal is generated by combinational logic whose inputs include the outputs of the storage devices and the data value. Because the minimum desired level of power consumption may be programmed by the user, thermal characterization and balancing of step load with average power are facilitated.

11 Claims, 4 Drawing Sheets

APPARATUS AND METHOD FOR REGULATING POWER CONSUMPTION IN A DIGITAL SYSTEM

FIELD OF THE INVENTION

This invention relates to the field of digital logic design, and more particularly to apparatus and methods for regulating power consumption in digital systems. More particularly still, the invention relates to apparatus and methods for maintaining a predetermined minimum level of power consumption by a digital system.

BACKGROUND

The market for digital systems has continually demanded higher and higher performance levels. Consequently, VLSI designs have become larger and larger to meet these ever-increasing performance demands. Unfortunately, this has caused the management of on-chip power consumption to become a difficult problem. On one hand, there is a motivation to minimize average power consumption because this reduces the required capacity of the cooling system. On the other hand, the change in power supply load per unit time must also be considered: If the functional blocks on the chip are capable of transitioning between a very low power state to a maximum power state within a few clock cycles, the response time of the power supply must be sufficiently fast to handle the "step load." Yet another problem caused by large step loads is that they resemble power cycling on the chip. Power cycling on the chip causes thermal stresses related to expansion and contraction of the chip packaging material; thus, certain packaging technologies (for example, C4 solder bumps) are rated for only a limited number of power cycles. Frequent large step loads may shorten the lifetime of such parts.

One prior ml solution to these problems has been to cause each of the functional blocks of a chip to consume full power at all times, even when not processing data. While this solution eliminates step load problems for the power supply, it results in the average power consumption being equal to the maximum power consumption for the chip, thus straining the cooling system.

Another prior art solution has been to disable clocks to functional blocks when the functional blocks are not processing data. This solution reduces average power but places large step loads on the power supply when idle functional blocks are powered up to process data. The result can be a drop in power supply voltage below an acceptable level. This solution also causes thermal cycling, which may shorten the lifetime of the part.

It is therefore an object of the present invention to provide a mechanism for regulating power consumption in a digital system.

It is a further object of the invention to provide a mechanism for setting the minimum average power consumed in a digital system and for minimizing step loads.

It is a still further object of the present invention to provide such a power regulating mechanism that is also programmable, so as to facilitate both thermal characterization of the digital system and the balancing of minimum step load with minimum average power.

SUMMARY OF THE INVENTION

The invention includes a mechanism for ensuring that the power consumed by functional blocks in a digital system does not fall below a predetermined level even when the functional blocks are not being used to process data. A start pulse is generated when it is time for the functional blocks to process data, and a dummy start signal is generated when it is desired to increase power consumption in the digital system even when it is not time for the functional blocks to process data. The functional blocks are triggered responsive to both the start pulses and the dummy start pulses.

In an embodiment, a means is provided for indicating the number of times the functional blocks have been triggered during recent clock cycles. A means is also provided for dictating the desired minimum level of power consumption for the digital system. A dummy start pulse generator uses this information to determine when to generate dummy start pulses.

In an embodiment for use with a digital system comprising a pipeline of triggerable functional blocks, a state machine sequentially applies trigger pulses to each of the functional blocks in the pipeline whenever the output of an OR gate is asserted. The state machine includes a series of storage devices, each having an output. Outputs of the storage devices are used as enable signals for gating a clock signal to the trigger inputs of the functional blocks. The inputs of the OR gate are coupled to a start signal that indicates when the functional blocks should be triggered to process data, and also to a dummy start signal that indicates when the functional blocks should be triggered to maintain power consumption.

In a further embodiment, the outputs of the storage devices are also used to indicate the number of times the pipeline has been triggered during recent clock cycles, and a programmable register is used to store a data value corresponding to the minimum desired level of power consumption for the pipeline. The dummy start signal is generated by combinational logic taking its inputs from the storage device outputs and the data value.

Because the minimum desired level of power consumption may be programmed by the user, thermal characterization and balancing of step load with average power are facilitated.

BRIEF DESCRIPTION OF THE DRAWINGS

The present invention is described herein with reference to the accompanying drawings, like reference numbers being used therein to indicate identical or functionally similar elements.

DETAILED DESCRIPTION OF THE PREFERRED EMBODIMENTS

Figure 1:
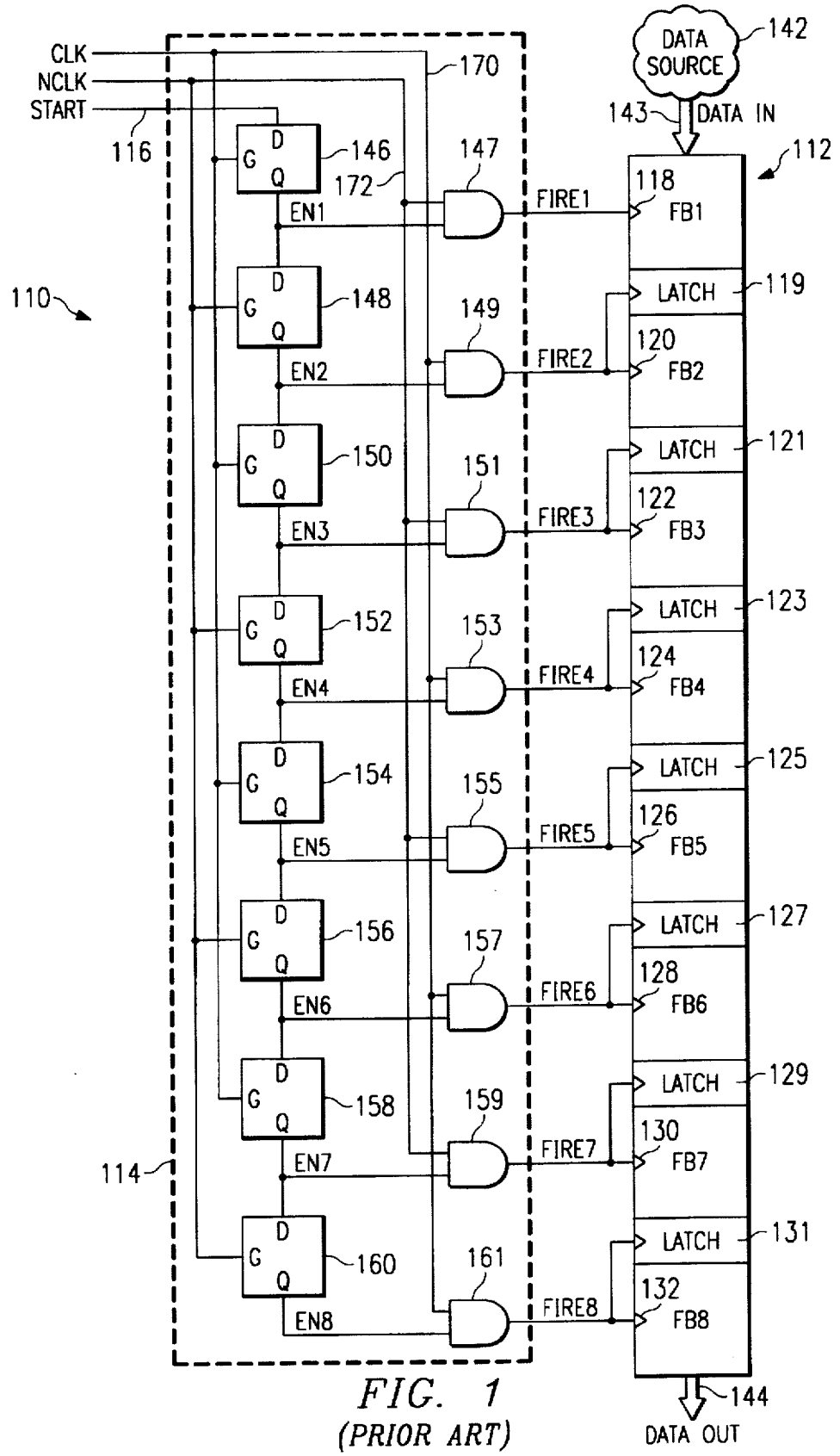
FIG. 1 is a schematic diagram illustrating a prior art digital system comprising a pipeline of functional blocks and a state machine for triggering the functional blocks in sequence responsive to a start signal.

FIG. 1 is a schematic diagram illustrating a prior art digital system 110 comprising a pipeline 112 of functional blocks FB1–FB8 and a state machine 114 for triggering the functional blocks in sequence responsive to a start signal 116. Pipeline 112 is intended herein to be representative of any pipeline of functional blocks in a digital system wherein the functional blocks are activated by applying a trigger signal, such as "fire" signals FIRE1-FIRE8, to a trigger input on each functional block, such as trigger inputs 118-132. The number of functional blocks in pipeline 112 may, of course, vary depending upon the application. Generally, each of functional blocks FB1-FB8 may consist of combinational logic, state machines, or a mixture of both. The first functional block FB1 in pipeline 112 receives data to be processed from a data source 142. Data source 142 may be any type of data source, but is typically a data path for routing data from other functional blocks or registers on the same processing chip on which pipeline 112 is implemented. Typically, each functional block in pipeline 112 is coupled to the immediately succeeding functional block by means of a data latch, such as latches 119-131.

A mechanism (not shown) is provided for generating a start signal 116 when new data from data source 142 is ready at data input 143 to be processed by pipeline 112. Upon sensing a start pulse on start signal 116, state machine 114 asserts the trigger signals FIRE1-FIRE8 one at a time, in sequence. This causes each of functional blocks FB1-FB8 to process the new data in serial fashion until, after the assertion by state machine 114 of trigger signal FIRE8, the new data has been completely processed by pipeline 112 and is presented at data output 144.

State machine 114 includes a series of storage devices such as one-bit latches 146-160. The functionality of each of latches 146-160 is such that, whenever gate input G is asserted, the state of data output Q will follow the state of data input D. As soon as gate input G is unasserted, however, the state of data output Q will freeze and hold its last value until gate input G is asserted again, at which time data output Q will begin tracking the state of data input D once more. The D input of latch 146 is connected to start signal 116. The data output Q of latch 146 is connected to the data input D of latch 148. The data output Q of latch 148 and all of the succeeding latches 150-160 are connected to the data input D of the immediately succeeding latch. Thus, latches 146-160 are arranged in series to propagate start signal 116 from latch 146 to latch 160 responsive to a clock signal applied to gate inputs G. A mechanism (not shown) is provided for generating a first clock signal 170 ("CLK") and a second clock signal 172 ("NCLK"). Typically, NCLK is an inverted version of CLK. The gate inputs G of latches 146, 150, 154 and 158 are connected to CLK, while the gate inputs of latches 148, 152, 156 and 160 are connected to NCLK. In other embodiments, a single clock may be used in lieu of dual-phase clocks CLK and NCLK.

AND gates 147-161 constitute a series of gating devices. Enable signals EN1-EN8 connect the outputs of latches 146-160, respectively, to one of the two inputs of AND gates 147-161, respectively. The other of the two inputs of AND gates 147, 151,155 and 159 are connected to NCLK, while the other of the two inputs of AND gates 149, 153, 157 and 161 are connected to CLK. Thus, enable signals EN1, EN3, EN5 and EN7, when asserted, cause NCLK to be gated to trigger inputs 118, 122, 126 and 130, respectively. Enable signals EN2, EN4, EN6 and EN8, when asserted, cause CLK to be gated to trigger inputs 120, 124, 128 and 132, respectively.

Figure 2:
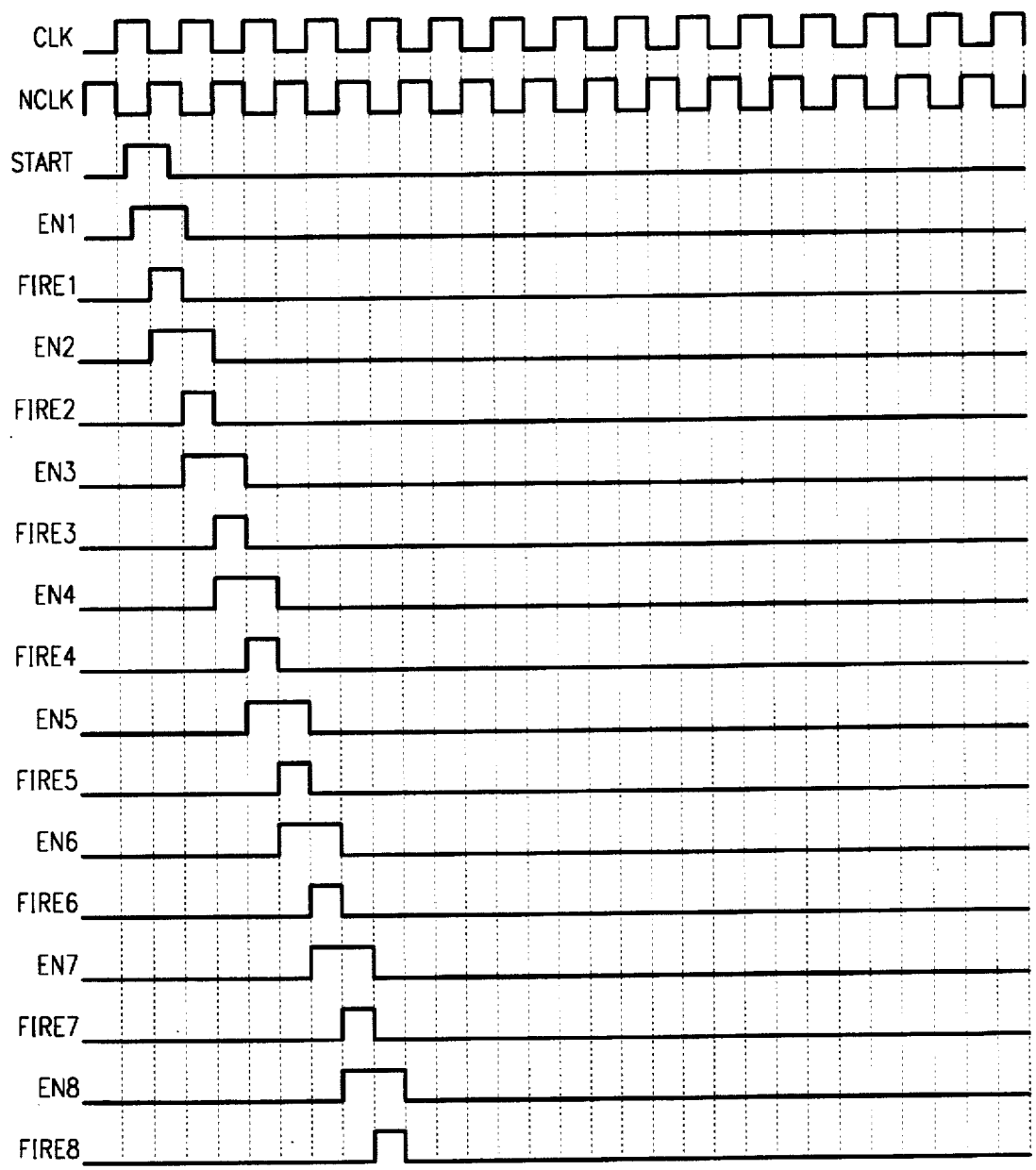
FIG. 2 is a timing diagram illustrating the operation of the digital system of FIG. 1.

For a better understanding of the operation of the digital system 110 of FIG. 1, reference will now be made to the timing diagram of FIG. 2. As can be seen in FIG. 2, NCLK is the inverse of CLK. Thus, the two clock signals are related by a 180° phase difference. Whenever both CLK and START are asserted, the START signal appears at the output of latch 146, causing EN1 to be asserted. Likewise, whenever EN1 is asserted and NCLK is asserted, FIRE1 will be asserted, triggering FB1. Also when EN1 is asserted and NCLK is asserted, the output of latch 148 will become asserted. When EN2 is asserted and CLK is asserted, FIRE 2 will be asserted, triggering FB2. (Once EN1 has been asserted, it will stay asserted until CLK is once again asserted and START is no longer asserted. Likewise, EN2 will remain asserted until NCLK is once again asserted and the output of latch 148 is no longer asserted.) As can be seen from the diagram, assuming a single assertion of START, the START pulse is effectively propagated to each of the enable signals EN1-EN8 sequentially and synchronous with every toggle of the clock signals. Because the enable signals are connected to clock gating devices 147-161, this causes trigger signals FIRE-FIRE8 also to become asserted sequentially and synchronous with every toggle of the clock signals. Importantly, if START were to be asserted again before the original START signal finished propagating through latches 146-160, the result would simply be that the second START signal would cause another ripple of trigger signals to propagate through state machine 114 behind the ripple of trigger signals that was already begun by the original START signal.

Figure 3:
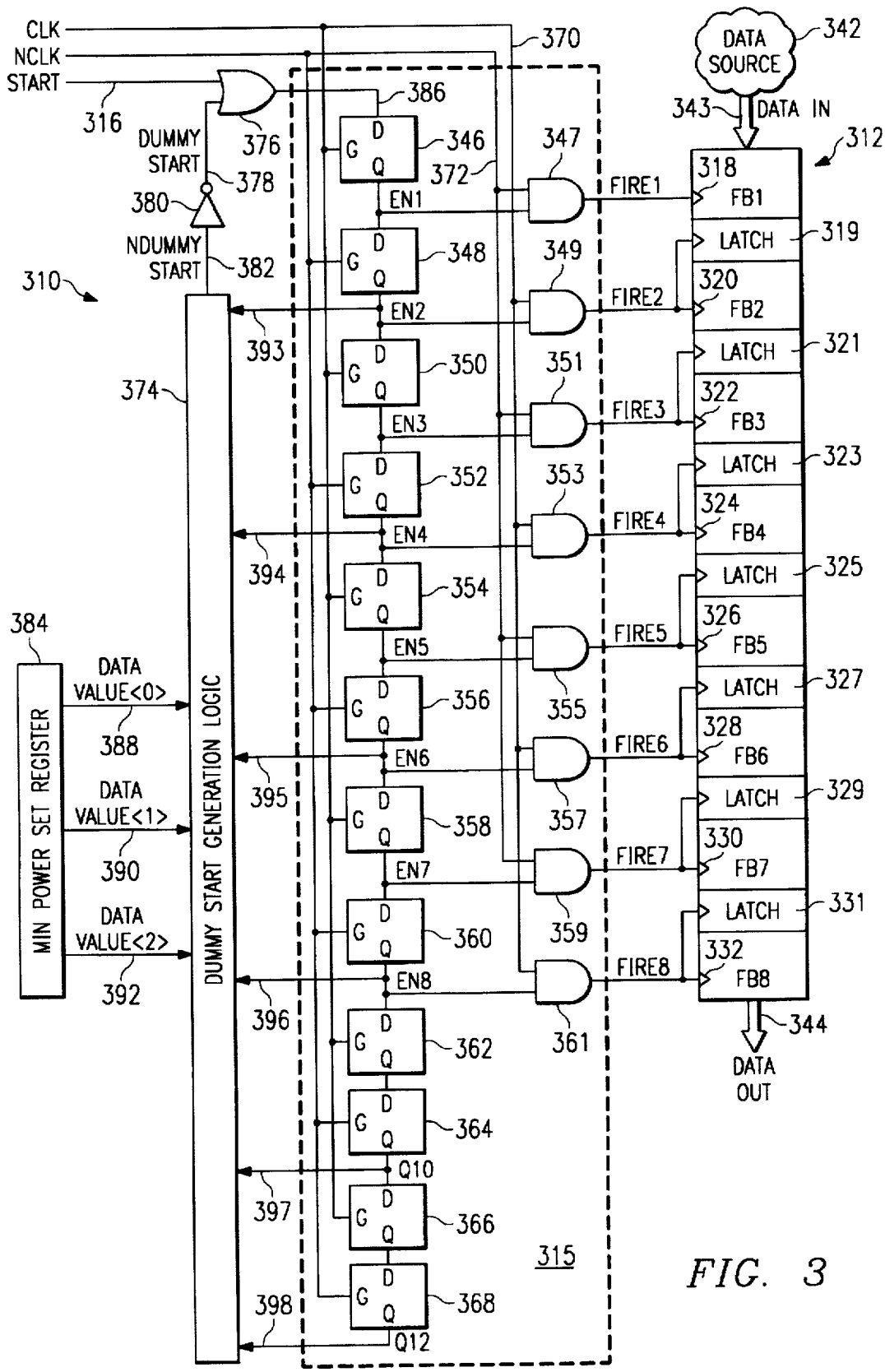
FIG. 3 is a schematic diagram illustrating an apparatus for regulating power consumption in a digital system according to a preferred embodiment of the invention.

FIG. 3 is a schematic diagram illustrating an apparatus for regulating power consumption in a digital system 310 according to a preferred embodiment of the invention. In the embodiment of FIG. 3, pipeline 312 corresponds to pipeline 112. State machine 315 is also provided. Elements 346-361 of state machine 315 correspond to elements 146-161 of state machine 114. State machine 315 also includes additional storage devices 362, 364, 366 and 368. Storage elements 364 and 368 have outputs Q10 and Q12, respectively. State machine 315 also includes lines 393, 394, 395, 396, 397 and 398 for connecting EN2, EN4, EN6, EN8, Q10 and Q12, respectively, to dummy start generation logic 374. Lines 393-398 constitute a data value that enables dummy start generation logic 374 to determine the approximate number of times pipeline 312 has been triggered during recent clock cycles. In other embodiments, fewer or greater numbers of functional blocks may be used in pipeline 312, and fewer or more storage devices and storage device outputs may be used to determine the approximate number of times pipeline 312 has been triggered during recent clock cycles.

A three-bit minimum power set register 384 is also provided. In other embodiments, minimum power set register 384 may contain fewer or more than three bits. The data output of minimum power set register 384 constitutes a data value that corresponds to a desired minimum level of power consumption for pipeline 312 (as will be discussed in more detail in relation to FIG. 5.) The data output of minimum power set register 384 is connected to dummy start generation logic 374 by means of lines 388 (data value bit 0), 390 (data value bit 1) and 392 (data value bit 2). Minimum power set register 384 is programmable in that any three-bit data value may be written into it by an external system (not shown). Preferably, minimum power set register 384 is an on-chip register.

The output of dummy start generation logic 374 is a signal called NDUMMYSTART, which is connected to an inverter 380 by line 382. (Of course, the scope of the invention is not limited by the signal assertion levels shown in the embodiment of FIG. 3.) The output of inverter 380 is a signal called DUMMYSTART, which is connected by line 378 to one of the inputs of OR gate 376. The other input of OR gate 376 is connected to START signal 316, which corresponds to START signal 116. The output of OR gate 376 is connected by line 386 to the D input of latch 346. Clock signals 370 and 372 correspond to clock signals 170 and 172. In other embodiments, a single clock signal may be used in lieu of a dual-phase clock signal.

It can be seen from FIG. 3 that whenever either START or DUMMYSTART is asserted, the result will be that a ripple of trigger pulses will be applied to trigger inputs 318–332 by state machine 315. When START signal 316 is asserted, pipeline 312 will process new data present at data input 343, and logic external to digital system 310 will read the processed data at data output 344 after the appropriate number of clock cycles has elapsed. On the other hand, the external logic will ignore the data present at output 344 at other times. Thus, although the triggering of pipeline 312 by DUMMYSTART will cause superfluous data to be presented at data output 344 at certain times, the superfluous data will not cause confusion within the system.

Figures 4, 5:
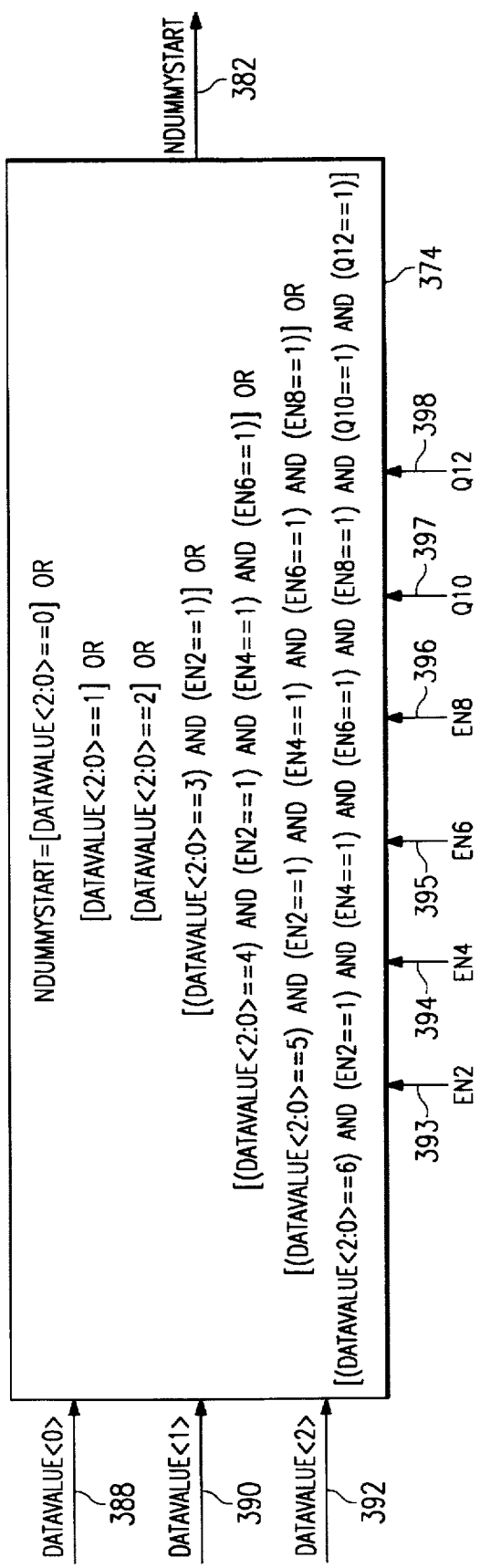
FIG. 4 is a schematic diagram illustrating a preferred implementation for the dummy start generation logic of FIG. 3.
FIG. 5 is a table illustrating the various modes of operation of the apparatus of FIG. 3.

FIG. 4 is a schematic diagram illustrating a preferred implementation for dummy staff generation logic 374. Preferably, dummy start generation logic 374 comprises combinational logic for evaluating the boolean expression shown in the drawing, using the following inputs: DATA-VALUE bits 0-2, EN2, EN4, EN6, EN8, Q10 and Q12. When NDUMMYSTART is asserted, this implies that no dummy start signal should be applied to state machine 315. It will be understood by those having ordinary skill in the field of digital logic design that combinational logic may easily be derived from the expression shown in FIG. 4. It will also be understood by those having ordinary skill in the field of digital logic design that various alternative boolean expressions may be implemented in dummy start generation logic 374 without departing from the scope of the invention.

FIG. 5 is a table illustrating the various modes of operation of the apparatus of FIG. 3 using the dummy start generation logic of FIG. 4. When the data value stored in minimum power set register 384 is either 0, 1 or 2, NDUMMYSTART will always be asserted, and therefore no dummy start pulses will be applied to state machine 315 under any circumstances. The result of this will be that, when pipeline 312 is not being used to process data (and therefore no START signals are being generated), pipeline 312 will consume minimum (virtually zero) power because none of its functional blocks will be triggered.

When the data value stored in minimum power set register 384 is 3, then NDUMMYSTART will be asserted only when EN2 is also asserted. Thus, in this state, whenever dummy start generation logic 374 senses that EN2 is not asserted, a dummy start signal will be applied to state machine 315 by OR gate 376, causing pipeline 312 to consume power even though it is not being used to process data. The result will be that power consumption of pipeline 312, when "idle," will equal one-half of the maximum power consumption for pipeline 312 (maximum power consumption for pipeline 312 being the amount of power consumed when all of functional blocks FB1–FB8 are triggered simultaneously).

When the data value stored in minimum power set register 384 is 4, then NDUMMYSTART will be asserted only when EN2, EN4, and EN6 are all asserted. Thus, in this state, whenever dummy start generation logic 374 senses that EN2, EN4 and EN6 are not all asserted, a dummy start signal will be applied to state machine 315 by OR gate 376. The result will be that power consumption of pipeline 312, when idle, will equal three-fourths of the maximum power consumption for pipeline 312.

When the data value stored in minimum power set register 384 is 5, then NDUMMYSTART will be asserted only when EN2, EN4, EN6, and EN8 are all asserted. Thus, in this state, whenever dummy start generation logic 374 senses that EN2, EN4, EN6 and EN8 are not all asserted, a dummy start signal will be applied to state machine 315 by OR gate 376. The result will be that power consumption of pipeline 312, when idle, will equal four-fifths of the maximum power consumption for pipeline 312.

When the data value stored in minimum power set register 384 is 6, then NDUMMYSTART will be asserted only when EN2, EN4, EN6, EN8, Q10 and Q12 are all asserted. Thus, in this state, whenever dummy start generation logic 374 senses that EN2, EN4, EN6, EN8, Q10 and Q12 are not all asserted, a dummy start signal will be applied to state machine 315 by OR gate 376. The result will be that power consumption of pipeline 312, when idle, will equal six-sevenths of the maximum power consumption for pipeline 312.

When the data value stored in minimum power set register 384 is 7, then NDUMMYSTART will never be asserted, and DUMMYSTART will be asserted continuously. Therefore, all of the functional blocks FB1–FB8 in pipeline 312 will be triggered continuously, and the power consumption of pipeline 312, when idle, will equal the maximum power consumption for pipeline 312.

Because minimum power set register 384 is programmable, thermal characterization for the chip is facilitated. Various levels for idle power consumption may be selected using a trial and error process, and a suitable level chosen for striking a rational balance between average power consumption for the chip and maximum step load. Once the desired idle power consumption level is known, the chip need not be re-manufactured to implement the desired level; rather, the data value corresponding to the desired idle power consumption level is automatically stored in minimum power set register 384 on system start-up. If necessary or desirable, minimum power set register 384 may also be reprogrammed "on the fly" by storing a different value in it during chip operation.

While the present invention has been described in detail in relation to various preferred embodiments thereof, the described embodiments have been presented by way of example only, and not by way of limitation. It will be understood by those skilled in the art that various changes may be made in the form and details of the described embodiments, resulting in equivalent embodiments that remain within the scope of the appended claims. For example, although the embodiments shown in the drawings herein relate to the use of a dual-phase clock, the invention may also be implemented in a digital system of the type having an edge-triggered pipeline that uses edge-triggered latches and a single-phase clock.

What is claimed is:

1. Apparatus for regulating power consumption in a digital system, said digital system of the kind comprising at least one triggerable functional block for processing data and wherein said at least one triggerable functional block consumes more power when triggered than when not triggered, said apparatus for regulating power consumption comprising:

circuitry for generating a start signal when it is time for said at least one triggerable functional block to begin processing data of interest;

first indication circuitry for indicating the approximate level of power being consumed by said at least one triggerable functional block;

second indication circuitry for indicating an approximate desired level of power to be consumed by said at least one triggerable functional block when it is not processing data of interest;

circuitry for generating a dummy start signal when it is desired to increase power consumption in said digital system regardless of whether it is time for said at least one triggerable functional block to begin processing data of interest, said circuitry for generating a dummy start signal responsive to said first and second indicator circuitry; and circuitry for triggering said at least one triggerable functional block responsive to both of said circuitry, for generating a start signal and said circuitry for generating a dummy start signal.

2. The apparatus of claim 1, wherein:

said first indication circuitry comprises circuitry for indicating the number of times said at least one triggerable functional block has been triggered during a certain number of recent clock cycles.

3. The apparatus of claim 2, wherein:

said second indication circuitry comprises a programmable register, said programmable register capable of storing a value corresponding to said approximate desired level, and said programmable register readable by said circuitry for generating a dummy start signal; and wherein said circuitry for generating a dummy start signal is operable to generate sufficient dummy start signals to ensure that the level of power consumption in said at least one triggerable functional block does not fall below said approximate desired level.

4. The apparatus of claim 3, wherein said circuitry for generating a dummy start signal comprises combinational logic whose output comprises said dummy start signal and whose inputs comprise said value and an output of said first indicating circuitry.

5. Apparatus for regulating power consumption in a digital system, said digital system of the kind comprising a plurality of functional blocks arranged in series; wherein each of said plural functional blocks is operable to produce output data responsive to a trigger input and to input data; wherein said input data for the first of said plural functional blocks is provided by a data source and said input data for each of the remainder of said plural functional blocks is provided by the immediately preceding functional block; and wherein each of said plural functional blocks consumes more power when it is triggered than when it is not triggered; said digital system also comprising circuitry for generating a start pulse when it is time for said plurality of functional blocks to begin processing new input data provided by said data source; said apparatus for regulating power consumption comprising:

power consumption indicating circuitry for indicating the approximate amount of power being consumed by said plurality of functional blocks;

circuitry for generating a dummy start pulse when it is desired to increase power consumption in the digital system even though it is not time to begin processing new input data provided by said data source, said circuitry for generating a dummy start pulse responsive to said power consumption indicating circuitry;

an OR gate having one input coupled to the output of said circuitry for generating a start pulse and another input coupled to the output of said circuitry for generating a dummy start pulse; and circuitry, responsive to the output of said OR gate, for applying a trigger pulse to the trigger input of each of said plural functional blocks in sequence.

6. The apparatus of claim 5, wherein:

said power consumption indicating circuitry comprises circuitry for indicating the number of start pulses and dummy start pulses that have been generated during a certain number of recent clock cycles; and wherein said circuitry for generating a dummy start pulse is operable to generate sufficient dummy start pulses to ensure that the level of power consumption in said digital system does not fall below a predetermined level.

7. The apparatus of claim 6, further comprising:

a programmable register readable by said circuitry for generating a dummy start pulse; and wherein said predetermined level corresponds to a data value stored in said programmable register.

8. The apparatus of claim 7, wherein said circuitry for applying a trigger pulse comprises:

a plurality of storage devices arranged in series and operable to propagate the output of said OR gate from the first to the last of said plural storage devices responsive to a clock signal, and wherein the outputs of said plural storage devices comprise a plurality of enable signals;

a plurality of gating devices, wherein each of said plural gating devices has one input coupled to one of said plural enable signals and another input coupled to said clock signal, and wherein each of said trigger inputs is coupled to the output of one of said plural gating devices; and wherein said power consumption indicating circuit comprises at least one of said plural enable signals.

9. The apparatus of claim 8, wherein said circuitry for generating a dummy start pulse comprises combinational logic whose inputs include said data value and said at least one of said plural enable signals.

10. A method for regulating power consumption in a digital system, said digital system of the kind comprising at least one triggerable functional block for processing data and wherein said at least one triggerable functional block consumes more power when triggered than when not triggered, said apparatus for regulating power consumption comprising:

reading a first data value, said first data value corresponding to a minimum desired level of power consumption for said digital system;

determining a second data value corresponding to the number of times said at least one triggerable functional block has been triggered during a certain number of recent clock cycles;

producing a dummy start signal as a boolean function of said first and second data values; and triggering said at least one triggerable functional block responsive to said dummy start signal.

11. The method of claim 10, further comprising the step of storing said first data value in an on-chip register.

* * * * *

UNITED STATES PATENT AND TRADEMARK OFFICE
CERTIFICATE OF CORRECTION

PATENT NO.   : 5,740,087
DATED        : April 14, 1998
INVENTOR(S)  : David R. Smentek, Craig, A. Heikes, and Robert H. Miller, Jr.

It is certified that error appears in the above-identified patent and that said Letters Patent is hereby corrected as shown below:

In the Specification:

Column 1,
Line 36: "m1" and insert therefor --art-- (PTO's error)

In the Amendment dated 9/23/97 -- In the Claims:

Column 7,
Line 10: "indicator" should be --indication-- (PTO's error)
Line 13: Delete "," after circuitry (PTO's error)

Column 8,
Line 38: "circuit" should be --circuitry-- (PTO's error)

Signed and Sealed this

Nineteenth Day of June, 2001

*Attest:*

*Attesting Officer*

NICHOLAS P. GODICI
*Acting Director of the United States Patent and Trademark Office*